US007004701B2

(12) United States Patent
Ross

(10) Patent No.: US 7,004,701 B2
(45) Date of Patent: Feb. 28, 2006

(54) TAMPER RESISTANT ROTABLY SHROUDED SECURITY CAP AND TOOL

(76) Inventor: William K. Ross, 1791 Lewis Center Rd., Lewis Center, OH (US) 43035

( * ) Notice: Subject to any disclaimer, the term of this patent is extended or adjusted under 35 U.S.C. 154(b) by 0 days.

(21) Appl. No.: 10/412,398

(22) Filed: Apr. 11, 2003

(65) Prior Publication Data

US 2004/0202527 A1 Oct. 14, 2004

(51) Int. Cl.
*F16B 38/08* (2006.01)
*F16B 41/00* (2006.01)

(52) U.S. Cl. ....................... 411/432; 411/429; 411/910; 411/405

(58) Field of Classification Search ................ 411/403, 411/405, 432, 429, 431, 910
See application file for complete search history.

(56) References Cited

U.S. PATENT DOCUMENTS 7,598 A 4/1877 Hall
1,447,564 A * 3/1923 Norlund et al. ......... 411/910 X
2,095,272 A 9/1934 Deane
2,588,372 A * 3/1952 Erb ............................ 411/432
2,823,725 A * 2/1958 Frederick .................... 152/431
2,889,733 A * 6/1959 Vanderhoof ................. 411/432
3,060,785 A * 10/1962 Corlett et al. ............... 411/548
3,448,762 A 6/1969 Schmitt
3,453,655 A 7/1969 Quinones et al.
3,471,158 A * 10/1969 Solins ........................ 277/644
3,492,841 A * 2/1970 Ipri ............................. 70/231
3,519,979 A * 7/1970 Bodenstein ................. 439/133
3,935,877 A 2/1976 Franceschi
4,018,111 A 4/1977 Goldhaber
4,037,515 A * 7/1977 Kesselman ..................... 411/3
4,231,240 A * 11/1980 Fujita et al. .................. 70/173
4,620,428 A * 11/1986 Kopesky ...................... 70/175
4,659,273 A * 4/1987 Dudley ....................... 411/373
4,693,655 A * 9/1987 Omori ........................ 411/429
4,710,082 A * 12/1987 Curtis ........................ 411/373
4,726,723 A * 2/1988 Bainbridge ................. 411/432
4,742,702 A * 5/1988 Swertz ........................ 70/231
4,784,555 A * 11/1988 Cantrell ...................... 411/431
RE33,114 E 11/1989 Chiavon
4,897,008 A * 1/1990 Parks ......................... 411/432
5,033,501 A 7/1991 Stehling
5,071,300 A * 12/1991 McCauley .................. 411/222
5,072,750 A 12/1991 Poms et al.
5,112,176 A * 5/1992 McCauley et al. ...... 411/910 X
5,228,250 A * 7/1993 Kesselman .............. 411/910 X
5,360,304 A * 11/1994 Notaro et al. ............... 411/432

(Continued)

*Primary Examiner*—Katherine Mitchell
(74) *Attorney, Agent, or Firm*—Gallagher & Dawsey Co., LPA; Michael J. Gallagher; David J. Dawsey

(57) ABSTRACT

A tamper resistant rotably shrouded security cap and tool for preventing unauthorized access to a fluid handling system. The shroud and cap have cooperating engagement means that allows the shroud to rotate freely about the security cap, such that a grip on the shroud will not turn the cap. The cap is provided with a grip resistant upper surface to discourage gripping with compression type tools such as pliers. Additionally, the cap is recessed within the shroud to make unauthorized access more difficult and is provided with any one of a wide ranging selection of non-standard keyway type tool fittings such that a custom designed tool is required to tighten or to loosen the cap. The shroud and cap system maybe configured as a cap, a plug, or a valve stem, among other variations. Only those with access to the security socket tool can access the system.

14 Claims, 7 Drawing Sheets

U.S. PATENT DOCUMENTS

| | | | | | |
|---|---|---|---|---|---|
| 5,597,010 | A | * | 1/1997 | Hoffman et al. | 137/381 |
| 5,630,687 | A | | 5/1997 | Robinson | |
| 5,632,301 | A | | 5/1997 | Julicher | |
| 5,722,450 | A | | 3/1998 | Julicher | |
| 5,727,590 | A | | 3/1998 | Julicher et al. | |
| 5,730,567 | A | * | 3/1998 | Haseley et al. | 411/403 |
| 5,791,371 | A | | 8/1998 | Kemp, II | |
| 5,890,859 | A | | 4/1999 | Hasnik | |
| 5,904,383 | A | * | 5/1999 | van der Wal | 292/307 B |
| 5,996,613 | A | | 12/1999 | Bertolotti | |
| 6,017,177 | A | * | 1/2000 | Lanham | 411/410 |
| 6,024,522 | A | | 2/2000 | Bainbridge et al. | |
| 6,027,294 | A | * | 2/2000 | Newby | 411/231 |
| 6,062,787 | A | * | 5/2000 | Maddalena | 411/429 |
| 6,102,064 | A | | 8/2000 | Robinson | |
| 6,176,255 | B1 | | 1/2001 | Robinson | |
| 6,209,574 | B1 | | 4/2001 | Prewitt | |
| 6,308,997 | B1 | * | 10/2001 | Haseley et al. | 293/307 R |
| 6,571,588 | B1 | * | 6/2003 | Yuen | 411/910 X |
| 6,719,511 | B1 | * | 4/2004 | Notaro et al. | 411/431 |
| 2003/0044258 | A1 | | 3/2003 | Hove et al. | |

* cited by examiner

TAMPER RESISTANT ROTABLY SHROUDED SECURITY CAP AND TOOL

TECHNICAL FIELD

The present invention relates to the field of security caps, in particular, to a tamper resistant security cap for valves, drains, and similar fluid ingress and egress routes, and for a cooperating tool for employing the security cap.

BACKGROUND OF THE INVENTION

Since the development of the first fluid containing system, system designers have faced the need of preventing unauthorized access to such systems. While systems that are formed of entirely permanent fittings would be most highly tamper resistant and tamper obvious, the necessity of providing ingress and egress ports in most fluid systems has created the need for security caps to protect such ports.

Tampering with such systems may come in many forms, ranging from attempted access by well meaning but unauthorized persons to outright vandalism. Systems that are exposed to public access are the most vulnerable, while systems containing potentially harmful substances are the most important to protect. Examples would include drains of various types, particularly those draining chemical or plating tanks or otherwise providing access to hazardous substances; service access ports to various refrigeration systems, and access to such non-hazardous but critical systems as pneumatic tires.

Additionally, the public is exposed to many systems that operate under high pressures wherein an unsuspecting party tampering with the system may be seriously injured, if not killed, by a high pressure fluid escaping the fluid handling system. Such systems may include by way of example, and not limitation, gas, hydronic, steam, refrigerant, and compressed air piping systems, as well as many others.

A particular need for such a security cap exists in the refrigeration and air conditioning fields. Current environmental and safety standards have mandated a high degree and care in the handling of refrigerants. For example, Section 608 of the Federal Clean Air Act requires that all persons who maintain, service, repair, or dispose of appliances that contain regulated refrigerants be certified in proper refrigerant handling techniques. Obviously, the intent of this federal law is negated if equipment design allows unauthorized or untrained persons easy access to such refrigerants.

In attempts to discourage unauthorized access to fluid systems, various designs of security cap devices have been proposed. In general, such devices rely on one of two general mechanisms, the use of a non-standard fitting and tool for removal, or the shrouding of the cap within a protective device.

In the first group, typical of those methods utilizing non-standard tools for security caps, is U.S. Pat. No. 5,033,501 to Stehling, which provides a non-standard tool for the removal of fire hydrant caps. In a similar vein, U.S. Pat. No. 3,935,877 to Franceschi provides for a non-standard wrench to operate the water valve of a fire hydrant. The use of non-standard tools to prevent fitting removal is not restricted to cap or valve embodiments, however, as seen in U.S. Pat. No. 4,018,111 to Goldhaber and U.S. Pat. No. 6,024,522 to Bainbridge, et al., both of which provide security fasteners that are difficult to remove without a specially adapted tool.

The particular weakness of these non-standard tool based designs is that it is frequently possible to grip the non-standard fitting with a gripping tool, such as vise grip pliers or a pipe wrench, and thereby use a compression grip on the non-standard fitting to remove it. Some devices, such as the '501 device, attempt to use a grip resistant profile to discourage such tampering, but as long as any edges or irregularities are accessible, it is possible to defeat these caps with a suitable gripping tool.

A second group of designs that attempt to prevent unauthorized access rely on shrouding the fastener or access cap with some type of shrouding device. One type of design utilizes a locking shroud that completely covers the access area, as seen in U.S. Pat. No. 5,996,613 to Bertolotti. Such locking designs require a relatively complex and cumbersome lock and key assembly, and are not well suited for small embodiments. Another design is that of capped shrouds; such as seen in U.S. Pat. No. 5,791,371 to Kemp, or U.S. Pat. No. 5,890,859 to Hasnik; which rely on a non-standard tool to remove the cover of a capped shroud that covers a standard fitting. These shrouds also have significant drawbacks. The '371 device may be easily defeated by the use of snap ring or needle nose pliers in the keyholes of the locking cap, and additionally has a large sidewall on the cap that could easily be grasped with a gripping tool described above. The '859 device has an extremely small pin that is difficult to manipulate even for authorized access to the fastener.

A proposed solution has been to combine non-standard caps and shrouds in an attempt to have the two mechanisms cancel each others weaknesses. An example is seen in U.S. Pat. No. 3,453,655 to Quinones, et al., which employs a non-standard fitting recessed with a fixed shroud to operate the valve of a fire hydrant. The weakness of such a device is that the non-standard fitting is not a cap, but is an integral part of the valve itself. Therefore, such a system cannot be retrofitted onto a standard threaded cap installation by simply replacing the cap with a security cap. A rotating shroud is seen in U.S. Pat. No. 6,062,787 to Maddalena, wherein an outer shroud may rotate around an inner cap. However, like the '371 device above, simple tools, or even a piece of bent wire, may be used to defeat the keyhole security system and remove the shroud. Furthermore, the close tolerance between the outer shroud and the inner cap in the '787 device makes it likely that a compressing tool may be used to crush the shroud against the cap in order to effectuate its removal.

Accordingly, the art has needed a means of preventing access to fasteners or fluid system ports that is simple, lightweight, inexpensive to fabricate, and easily retrofitted onto existing applications, that at the same time is exceedingly difficult for unauthorized parties to access.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways.

In one of the simplest configurations, the tamper resistant rotably shrouded security cap and tool for preventing unauthorized access to a fluid handling system incorporates a grip resistant rotating shroud that encloses a security cap, and a security socket tool for using the device. The shroud has a cap engagement means on its inner surface that cooperates with and rotably engages a shroud engagement means on the security cap. The security cap incorporates at least one security keyway and has a grip resistant outer surface to deter unauthorized opening. The shroud engagement means rotably cooperates with the cap engagement means so that the shroud rotates freely and independently of the security cap. Lastly, the security socket is formed to fit within the shroud and engage at least one of the at least one keyways located in the security cap, thereby permitting the authorized user to remove the tamper resistant rotably shrouded security cap. The security socket is adapted to cooperate with the at least one security keyway of the security cap.

The use of the term fluid herein refers to substances having particles that easily move and change their relative position without a separation of the mass and that easily yield to pressure, thereby deforming substantially continuously under shearing (tangential) stresses. Therefore, a fluid may include substances in a gas or liquid phase, or any combination of these phases.

The shroud engagement means and the cap engagement means may take many forms. The cap engagement means may be formed as a cap retaining ledge extending from the shroud inner surface, or it may be formed as a cap receiver shelf recessed in the shroud. Similarly, the shroud engagement means may be formed as a shroud receiver shelf recessed into the cap or may be formed as a shroud retaining ledge extending from the cap outer surface. The ledges and the shelves may be formed in virtually any cooperating geometric shapes.

The construction of the shroud is such the shroud may not be compressed by a man of ordinary strength using standard hand tools, thus preventing the ledge from frictionally gripping the shelf and thereby permitting the shroud and the security cap to be turned in unison. Further, the shape of the shroud may incorporate features that may it difficult to be grasped by conventional hand tools. For example, the shroud may be round with a smooth exterior surface, or the shroud may be tapered.

Just as the shroud may incorporate features to prevent frictional gripping by conventional hand tools, so too can the security cap. The security cap may be formed with a grip resistant cap outer surface having any number of configurations, such as by way of example and not limitation, a smooth dome shaped projection, a smooth cone, or a pyramid configuration, to prevent unauthorized personnel from achieving a secure grip on the security cap with pliers, or similar hand tools.

A further security measure is the incorporation of at least one security keyway formed in the security cap. Such a keyway or keyways, and the instant invention utilizes both the singular and the plural interchangeably to encompass embodiments that may have one or more keyways, may be formed in the perimeter or the interior of the security cap. Either way, the keyways may be symmetrically spaced or may be spaced in any asymmetrical pattern.

The shape of the at least one keyway allows an additional level of security. The keyways may be formed in any partially closed, or totally closed, geometric shape, for instance, the keyways may be generally rectangular or be generally semicircular in shape. Multiple keyway shapes may be incorporated in the same security cap to increase the level of security by reducing the likelihood that some combination of conventional hand tools may be used to engage the keyways.

When the keyway or keyways are formed in the interior of the security cap, they are generally formed in a cap recess configured to cooperate with a male security socket, and generally formed in the sidewalls of the recess. Alternatively, each keyway may form its own recess in the security cap.

An additional measure of security that may be incorporated into various embodiments of the present invention involves forming the shroud such that the inner surface is as close to the security cap as possible while still permitting rotation. Additionally, the security cap and the shroud may be formed so as to minimize the size of the opening formed by the shroud inner surface such that conventional hand tools such as needle nose pliers may-not fit within the opening. Even if such tools can be reached into the shroud, minimization of the diameter of the shroud makes it increasingly unlikely that such tools could be opened in an effective manner. Similarly, as the height of the shroud is increased, the difficulty in effectively reaching the security cap with an unauthorized tool is increased, thus improving security.

For additional security, the lower edge of the security cap may be recessed within the shroud such that the security cap lower edge is internal to the shroud and above the shroud lower edge. Additionally, the security cap lower edge may be enclosed with a portion of the shroud. Such configurations prevent unauthorized personnel from attempting to grasp the lower edge of the security cap and thereby remove it.

While the shroud engagement means rotably cooperates with the cap engagement means so that the shroud rotates freely and independently of the security cap, the tamper resistant rotably shrouded security cap may incorporate any number of auxiliary rotation mechanisms to further reduce rotational friction. Such mechanisms may include at least one sleeve bearing or ball bearings located between the engagement means, or the simple use of low friction materials.

Any of the embodiments herein may incorporate a shroud cap to prevent the accumulation of the elements and other debris, and a cap retaining means to retain the cap.

The security cap may include numerous embodiments directed toward specific applications and include features relevant to such applications. For instance, the security cap may be formed having an inner surface that is threaded to cooperate with the male threads of an external device, thereby acting truly as a cap. Alternatively, the security cap may be formed with a male engagement projection that is externally threaded, to act as a plug. Further, the shroud and security cap may be formed to surround a valve stem. One particular embodiment is directed to a tamper resistant rotably shrouded security cap for use in residential and light commercial refrigeration systems to secure ¼" flare fittings and prevent unauthorized access to the refrigerant. The tamper resistant rotably shrouded security cap can be applied to fluid handling systems of any type, size and configuration.

The security socket may be formed in numerous variations to cooperate with any of the tamper resistant rotably shrouded security cap embodiments described herein. One such embodiment is a female socket configuration wherein the security socket is designed to fit inside the shroud and receive the security cap. The security socket of the present embodiment includes a socket inner surface having at least one keyway engager adapted to cooperate with the at least one keyway in the security cap. The security socket may be formed as a distinct tool that must be attached to an external tool, such as a socket wrench, for application of rotary force, or the security socket may be formed as a unitary tool. The security socket may be formed with a gripping recess and surface texture to assist the user in gripping the security socket. The security socket may be formed to include means for being engaged by virtually any external rotary force producing tool. For example, the security socket may include a tool engager that works with conventional socket wrenches. Alternatively, the tool engager may be sized to cooperate with the 5⁄16" square opening of a refrigeration valve wrench. Yet another option for the tool engager is simply a hole that passes through the security socket and receives a small bar that may be used to provide torque on the security socket. When the security socket is formed as a unitary tool, it may include a gripping device such as a screwdriver handle, a shaft, and a tool engagement region, in addition to the security socket.

In sum, access to fluid systems can be restricted to those who are authorized to service or otherwise access such systems by restricting the availability of the security socket.

BRIEF DESCRIPTION OF THE DRAWINGS

Without limiting the scope of the present invention as claimed below and referring now to the drawings and figures:

DETAILED DESCRIPTION OF THE INVENTION

The tamper resistant rotably shrouded security cap and security socket tool of the instant invention enables a significant advance in the state of the art. The preferred embodiments of the apparatus accomplish this by new and novel arrangements of elements and methods that are configured in unique and novel ways and which demonstrate previously unavailable but preferred and desirable capabilities.

The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
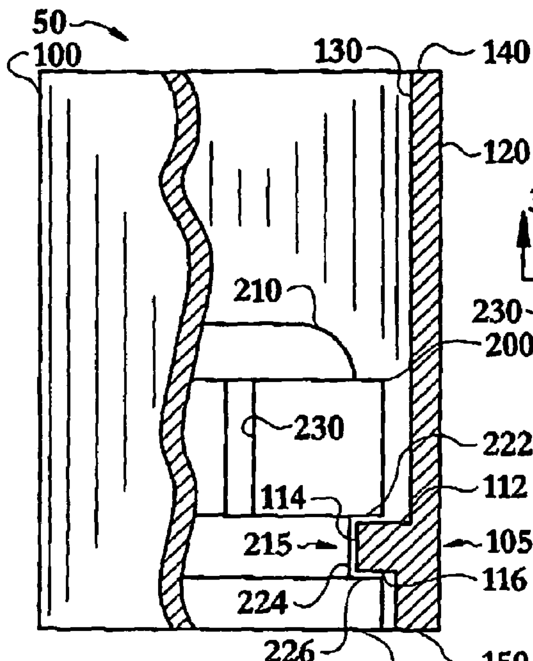
FIG. 1 shows a security cap of the present invention in partial cut-away section view, not to scale.
Figure 9:
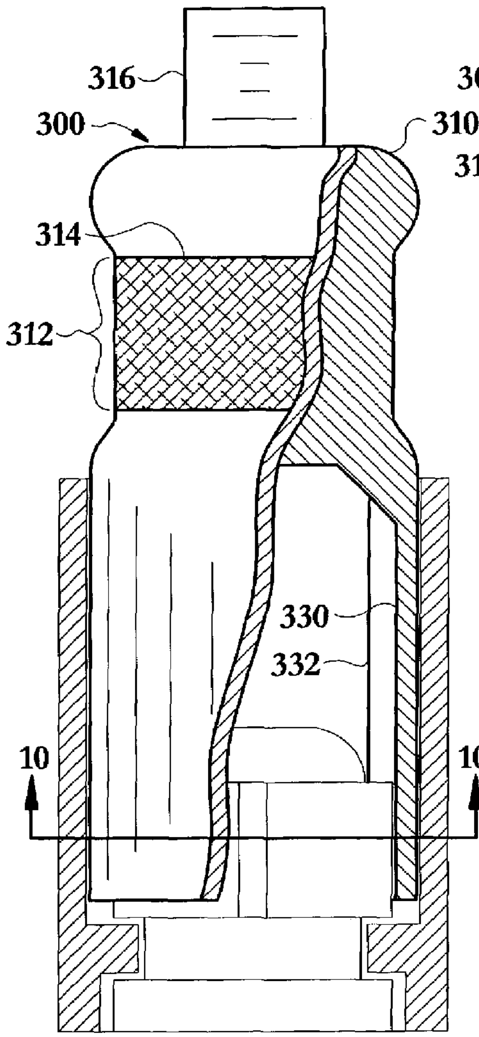
FIG. 9 shows a tool for use in cooperation with the security cap of FIG. 1 in partial cut-away section view, not to scale.
Figure 10:
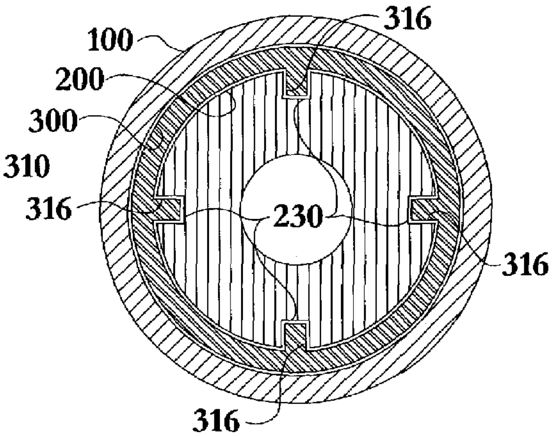
FIG. 10 shows the tool and security cap of FIG. 9 in cross-sectional view taken along section line 10—10 in FIG. 9, not to scale.

In its simplest form the tamper resistant rotably shrouded security cap and tool for preventing unauthorized access to a fluid handling system incorporates a grip resistant rotating shroud 100, a security cap 200, and a security socket 300, as illustrated in FIG. 1 and FIG. 9. The shroud 100 has an outer surface 120, an inner surface 130, a top edge 140, and a lower edge 150, and is formed to have a cap engagement means 105. Generally, the security cap 200 is located within the confines of the shroud 100. The security cap 200 incorporates at least one security keyway 230 and has a grip resistant outer surface 210, an inner surface 240, and a cap lower edge 250, and is formed to have a shroud engagement means 215. The shroud engagement means 215 rotably cooperates with the cap engagement means 105 so that the shroud 100 rotates freely and independently of the security cap 200. Lastly, the security socket 300 is formed to fit within the shroud 100 and engage at least one of the at least one keyway 230 located in the security cap 200, thereby permitting the authorized user to remove the tamper resistant rotably shrouded security cap 50. The security socket 300 incorporates a socket outer surface 310, a socket inner surface 330, and an at least one keyway engager 332 adapted to cooperate with the at least one security keyway 230 of the security cap 200, as illustrated in FIG. 9.

Figure 14:
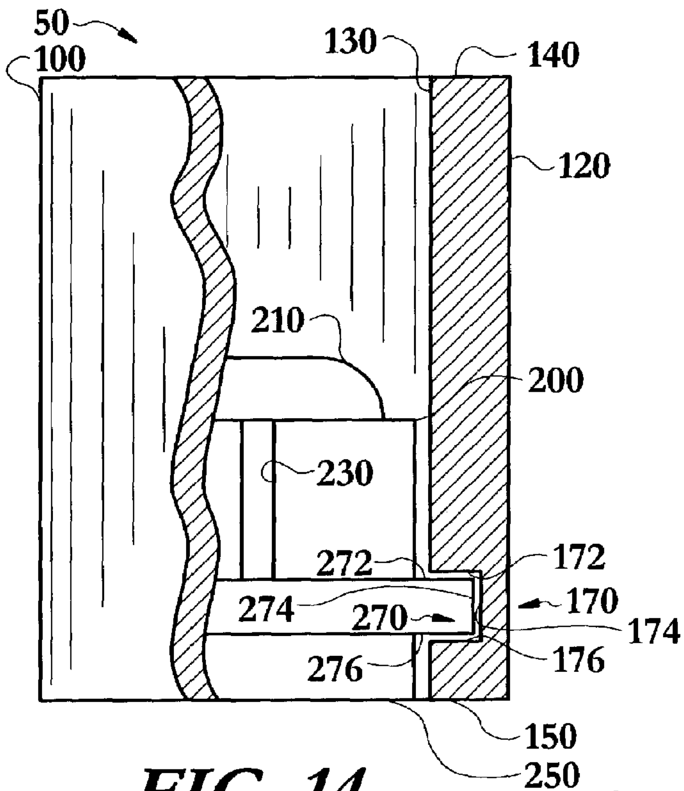
FIG. 14 shows a variation of the security cap of FIG. 1 in partial cut-away section view, not to scale.

The shroud engagement means 215 and the cap engagement means 105 may take many forms. The cap engagement means 105 may be formed as a cap retaining ledge 110 extending from the shroud inner surface 130, as shown in FIG. 1, or it may be formed as a cap receiver shelf 170 recessed in the shroud 100, as shown in FIG. 14. Similarly, the shroud engagement means 215 may be formed as a shroud receiver shelf 220, as shown in FIG. 1, or it may be formed as a shroud retaining ledge 270, as shown in FIG. 14. Further, the ledges 110, 270 and the shelves 170, 220 may be formed in virtually any cooperating geometric shapes, although they are shown as generally rectangular in the figures. Such shapes may include semicircles, ovals, triangles, or others.

Figure 2:
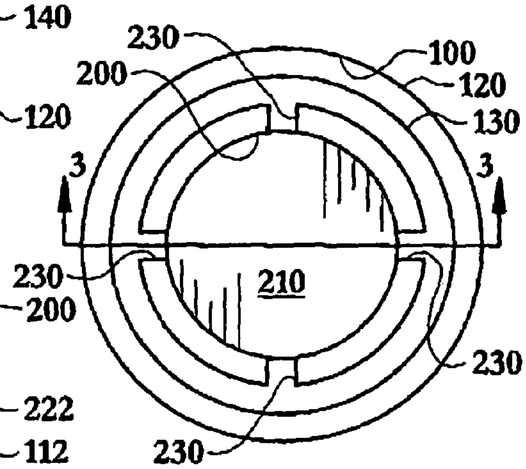
FIG. 2 shows the security cap of FIG. 1 in top plan view, not to scale.
Figure 4:
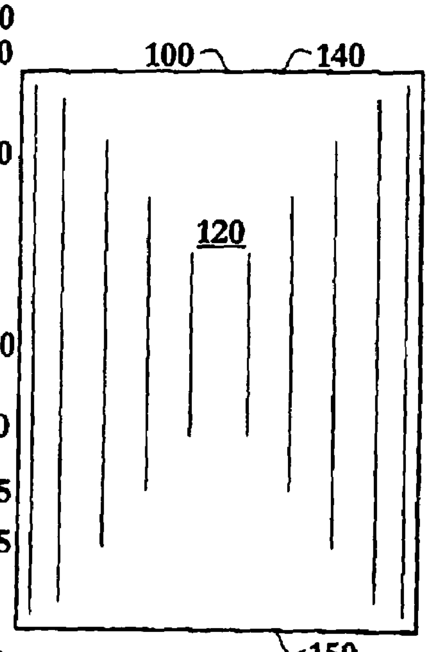
FIG. 4 shows the security cap of FIG. 1 in side elevation view, not to scale.
Figure 5:
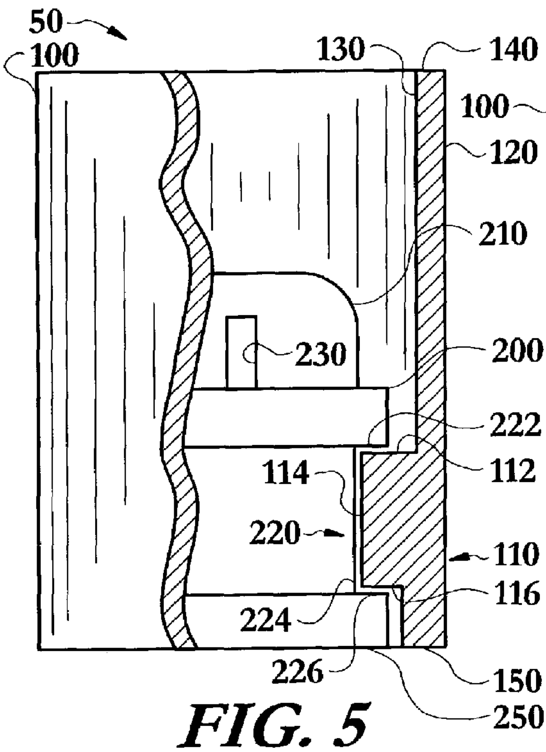
FIG. 5 shows a variation of the security cap of FIG. 1 in partial cut-away section view, not to scale.
Figure 20:
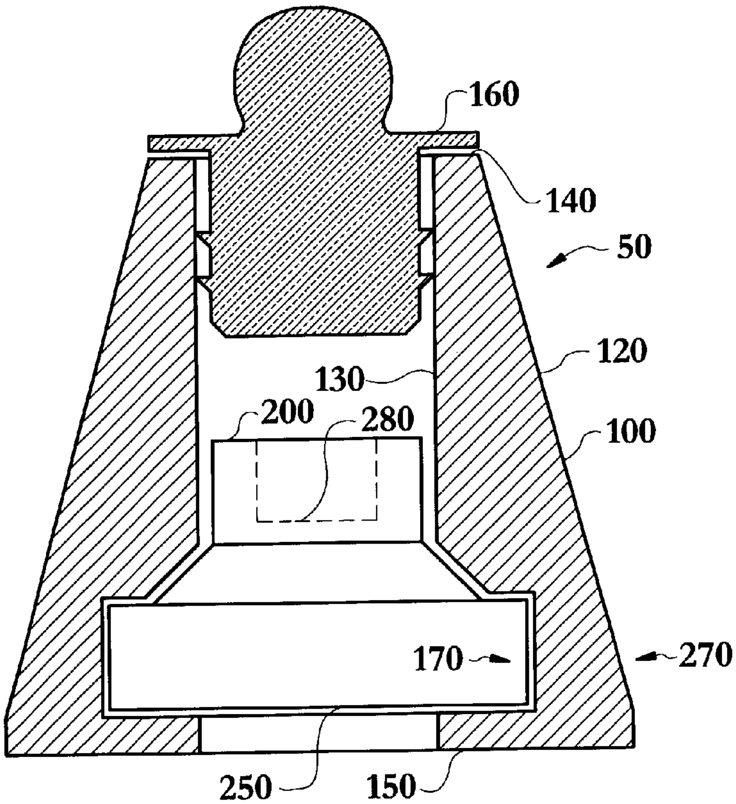
FIG. 20 shows a variation of the security cap of FIG. 1 in partial cut-away section view, not to scale.

When the cap engagement means 105 is formed as a cap retaining ledge 110, as shown in FIG. 5, the cap retaining ledge 110 may include a ledge top surface 112, a ledge sidewall 114, and a ledge lower surface 116. Similarly, the cooperating shroud receiving shelf 220 may include a shelf top surface 222, a shelf sidewall 224, and a shelf lower surface 226. The ledge 110 and the shelf 220 are sized to cooperate and allow the shroud 100 to rotate about a fixed security cap 200 independently. The construction of the shroud 100 is such the shroud 100 may not be compressed by a man of ordinary strength using standard hand tools, thus preventing the ledge 110 from frictionally gripping the shelf 220 and thereby permitting the shroud 100 and the security cap 200 to be turned in unison. Further, the shape of the shroud 100 may incorporate features that may it difficult to be grasped by conventional hand tools. For example, the shroud 100 may be round with a smooth exterior surface, as shown in FIG. 2 and FIG. 4, or the shroud 100 may be tapered as shown in FIG. 20, just to name a few.

Alternatively, when the cap engagement means 105 is formed as a cap receiver shelf 170, as shown in FIG. 14, the cap receiver shelf 170 may include a shelf top surface 172, a shelf sidewall 174, and a shelf lower surface 176. Similarly, the cooperating shroud retaining ledge 270 may include a ledge top surface 272, a ledge sidewall 274, and a ledge lower surface 276. Again, the ledge 270 and the shelf 170 are sized to cooperate and allow the shroud 100 to rotate about a fixed security cap 200 independently.

Figure 6:
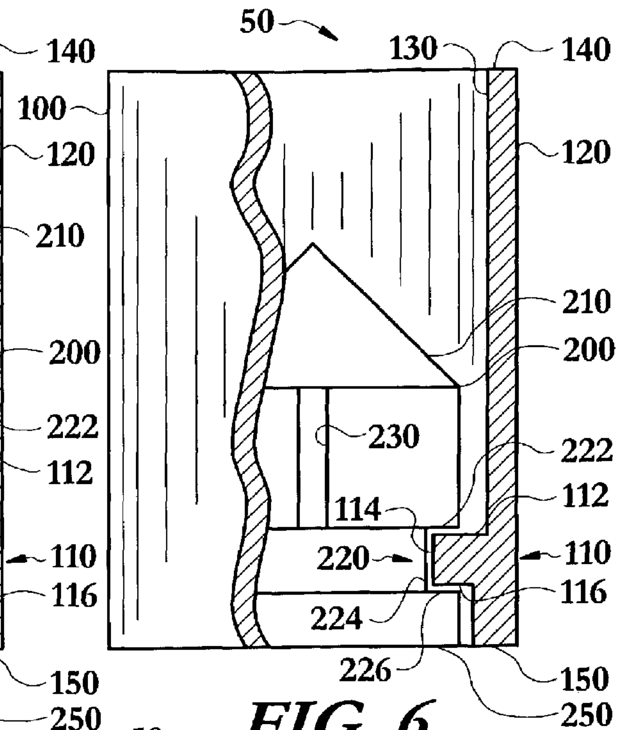
FIG. 6 shows a variation of the security cap of FIG. 1 in partial cut-away section view, not to scale.

Just as the shroud 100 may incorporate features to prevent frictional gripping by conventional hand tools, so too can the security cap 200. The security cap 200 may be formed so that a tool entering the shroud 100 is met by a grip resistant cap outer surface 210. This grip resistant cap outer surface 210 may have any number of configurations. For example, as shown in FIG. 1, the grip resistant cap outer surface 210 may simply be formed as a smooth dome shaped projection. Alternatively, the grip resistant cap outer surface 210 may be formed in a smooth cone, or pyramid configuration, as shown in FIG. 6. Such configurations prevent unauthorized personnel from achieving a secure grip on the security cap 200 with pliers, or like hand tools.

A further security measure is the incorporation of at least one security keyway 230 formed in the security cap 200. Such a keyway or keyways 230, and the instant invention utilizes both the singular and the plural interchangeably to encompass embodiments that may have one or more keyways, may be formed in the perimeter of the security cap 200, as shown in FIG. 1 through FIG. 15, or formed in the interior of the security cap 200, as shown in FIG. 16 through FIG. 20. Either way, the keyways 230 may be symmetrically spaced, as shown in FIG. 2, FIG. 7, FIG. 10, and FIG. 17, or may be spaced in any asymmetrical pattern, as one with skill in the art can appreciate.

Figure 7:
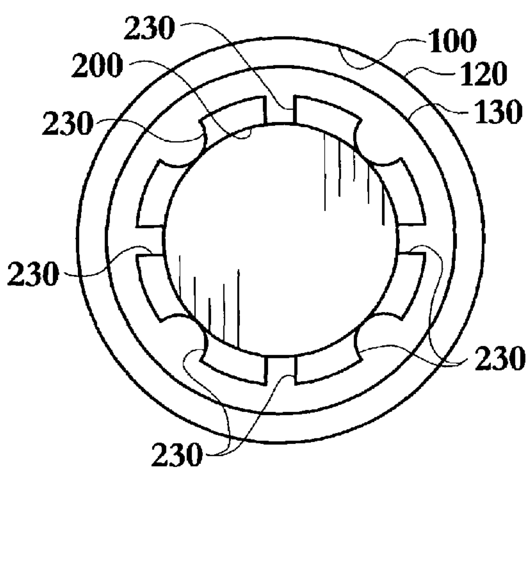
FIG. 7 shows a variation of the security cap of FIG. 1 in top plan view, not to scale.

Similarly, the shape of the at least one keyway 230 allows an additional level of security. The keyways 230 may be formed in any partially closed, or totally closed, geometric shape. For instance, the keyways 230 may be generally rectangular in shape, as shown in FIG. 2, and alternatively they may be generally semicircular in shape, as shown in FIG. 7. One with skill in the art can appreciated that the keyways may also be formed in a generally triangular configuration and virtually any polygon shape. Further, multiple keyway 230 shapes may be incorporated in the same security cap 200 to increase the level of security by reducing the likelihood that some combination of conventional hand tools may be used to engage the keyways 230.

Figure 17:
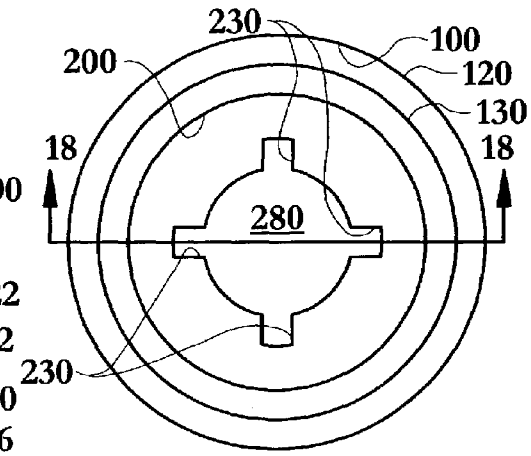
FIG. 17 shows the security cap of FIG. 16 in top plan view, not to scale.
Figure 18:
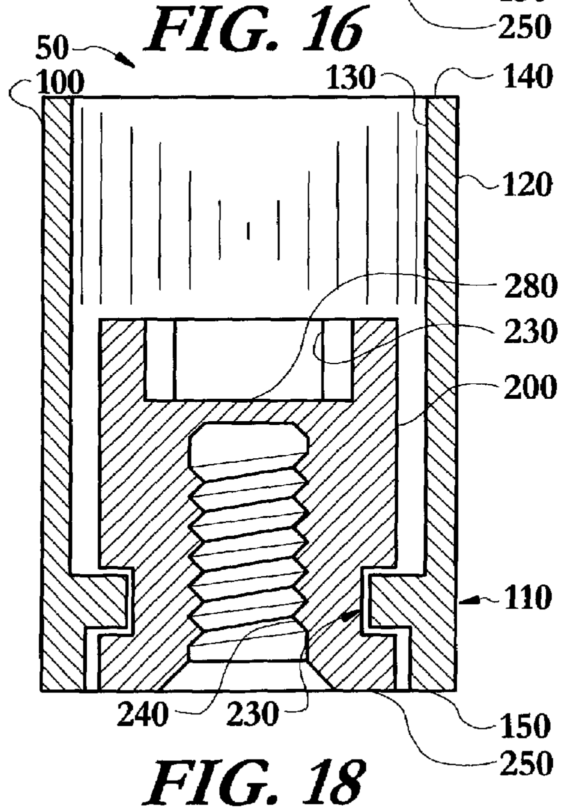
FIG. 18 shows the security cap of FIG. 16 in cross-sectional view taken along section line 18—18 in FIG. 17, not to scale.
Figure 21:
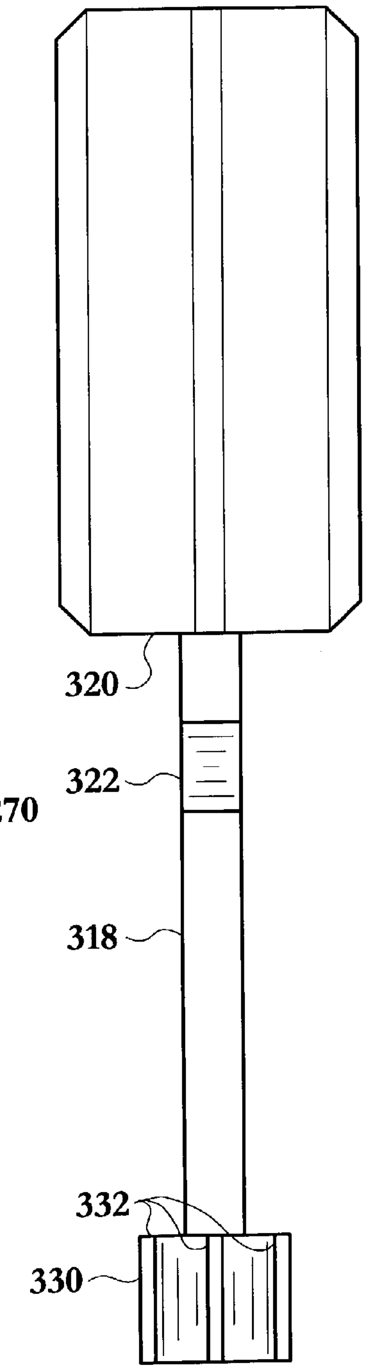
FIG. 21 shows a security socket tool for use in cooperation with the security cap of FIG. 20 in front elevation view, not to scale.

In embodiments wherein the keyways 230 are formed in the interior of the security cap 200 they are generally formed in a cap recess 280, as shown in FIG. 16 through FIG. 20, configured to cooperate with a male security socket 300, seen in FIG. 21. The keyways 230 are generally formed in the sidewalls of the recess 280 as shown in FIG. 17. Alternatively, as one with skill in the art can appreciate, each keyway 230 may form its own recess in the security cap 200.

Figure 19:
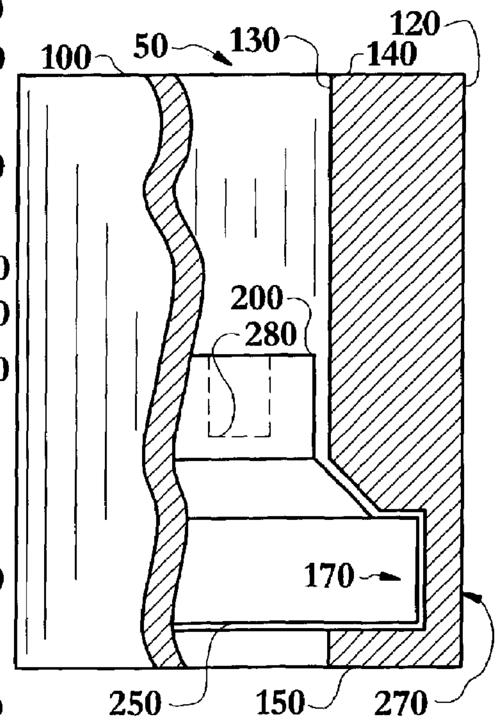
FIG. 19 shows a variation of the security cap of FIG. 1 in partial cut-away section view, not to scale.

An additional measure of security that may be incorporated into various embodiments of the present invention involves forming the shroud 100 such that the inner surface 130 is as close to the security cap 200 as possible while still permitting rotation. As such, the inner surface 130 may follow the contour of the security cap 200 as shown in FIG. 19 and FIG. 20. Additionally, the security cap 200 and the shroud 100 may be formed so as to minimize the size of the opening formed by the shroud inner surface 130 such that conventional hand tools such as needle nose pliers may not fit within the opening. Even if such tools can be reached into the shroud, minimization of the diameter of the shroud makes it increasingly unlikely that such tools could be opened in an effective manner. Similarly, as the height of the shroud is increased, the difficulty in effectively reaching the security cap with an unauthorized tool is increased, thus improving security.

Figure 8:
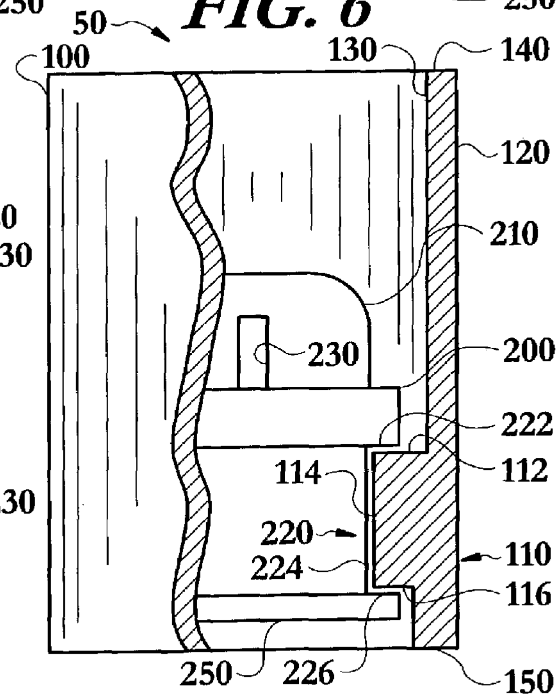
FIG. 8 shows a variation of the security cap of FIG. 5 in partial cut-away section view, not to scale.

Further, an additional level of security is provided in the embodiments shown in FIG. 8, FIG. 19, and FIG. 20 wherein the lower edge 250 of the security cap 200 is recessed within the shroud 100 such that the security cap lower edge 250 is internal to the shroud 100 and above the shroud lower edge 150. The embodiments of FIG. 19 and FIG. 20 go still further to enclose the security cap lower edge 250 with a portion of the shroud 100. Such bottom enclosure may be accomplished by the manner in which the shroud 100 is formed, or by the attachment of an external portion to close the bottom portion of the shroud 100. For instance, the bottom portion of the shroud shown in FIG. 19 and FIG. 20 may be as simple as a washer, or similar appurtenance, secured to the body of the shroud 100 by welding, brazing, adhesive, or mechanical means. Such configurations prevent unauthorized personnel from attempting to grasp the lower edge 250 of the security cap 200 and thereby remove it.

Figure 11:
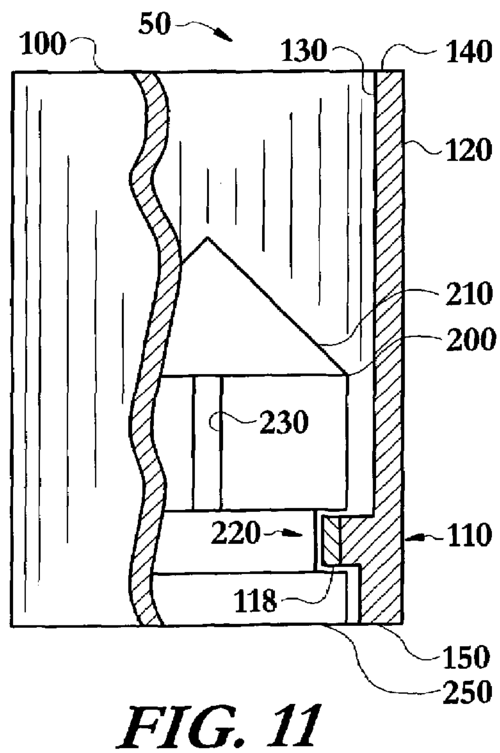
FIG. 11 shows a variation of the security cap of FIG. 1 in partial cut-away section view, not to scale.
Figure 15:
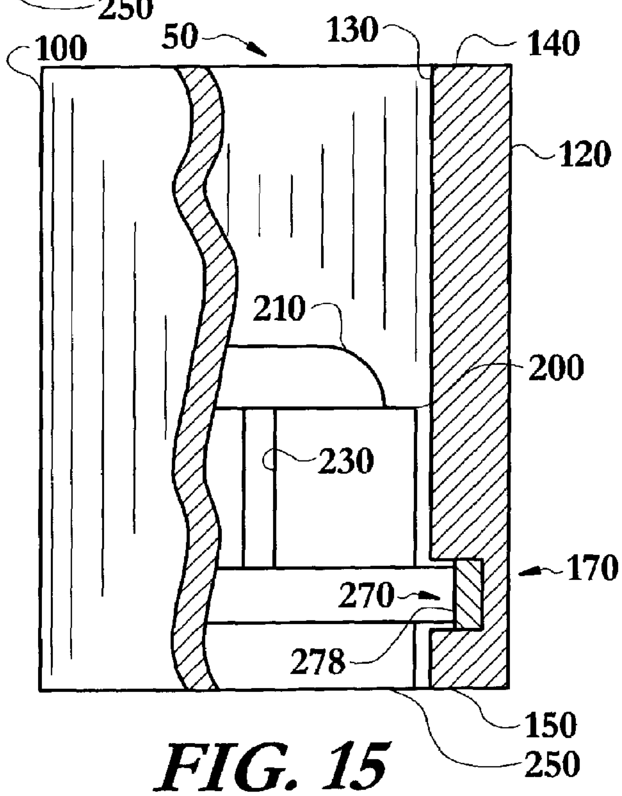
FIG. 15 shows a variation of the security cap of FIG. 14 in partial cut-away section view, not to scale.
Figure 16:
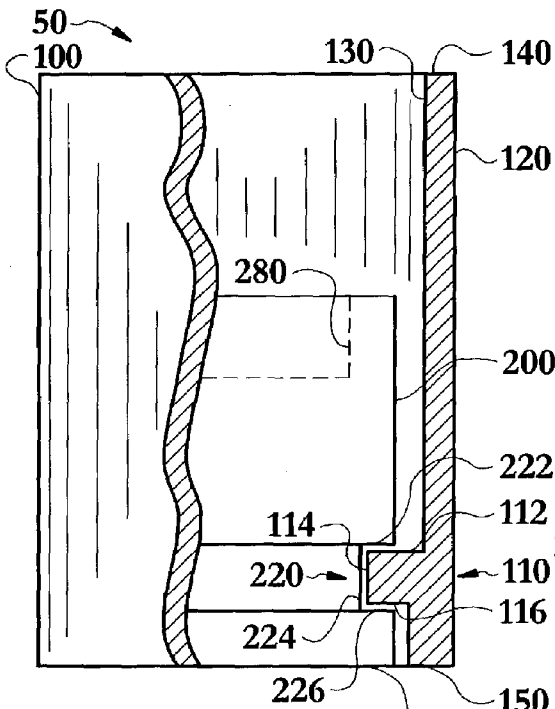
FIG. 16 shows a variation of the security cap of FIG. 1 in partial cut-away section view, not to scale.

While the shroud engagement means 215 rotably cooperates with the cap engagement means 105 so that the shroud 100 rotates freely and independently of the security cap 200, the tamper resistant rotably shrouded security cap 50 may incorporate any number of auxiliary rotation mechanisms 118, 278, as shown in FIG. 11 and FIG. 15. The auxiliary rotation mechanisms 118, 278 reduce the friction between the shroud 100 and the security cap 200 during rotation and may include any friction reducing configuration. In one embodiment the auxiliary rotation mechanism 118, 278 may include at least one sleeve bearing to reduce friction. Other alternatives include ball bearings located in cooperating races in the shroud 100 and the security cap 200, and low friction materials. As one with skill in the art can appreciate, the auxiliary rotation mechanism 118, 278 may incorporate virtually any bearing system including, but not limited to, fluid-film bearings such as journal bearings, thrust bearings, and guide bearings, as well as rolling contact bearings such as ball bearings, roller bearings, and thrust bearings.

Figure 13:
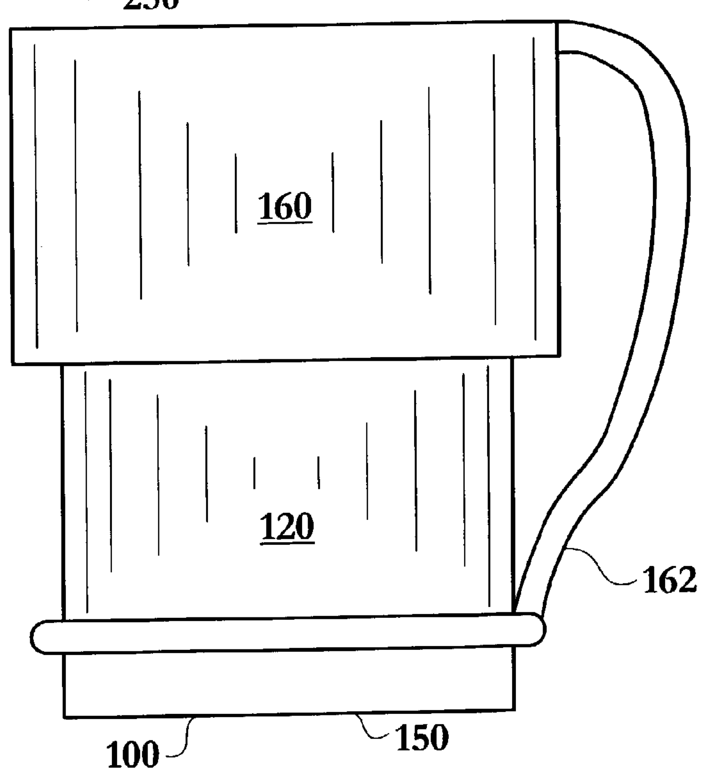
FIG. 13 shows a variation of the security cap of FIG. 1 in side elevation view, not to scale.

Additionally, any of the embodiments herein may incorporate a shroud cap 160, shown in FIG. 13, to enclose the shroud top edge 140 of the rotating shroud 100 to prevent the accumulation of the elements and other debris. The shroud cap 160 may further include a cap retaining means 162 so that the shroud cap 160 remains attached to the shroud 100 when not enclosing the shroud top edge 140.

Figure 3:
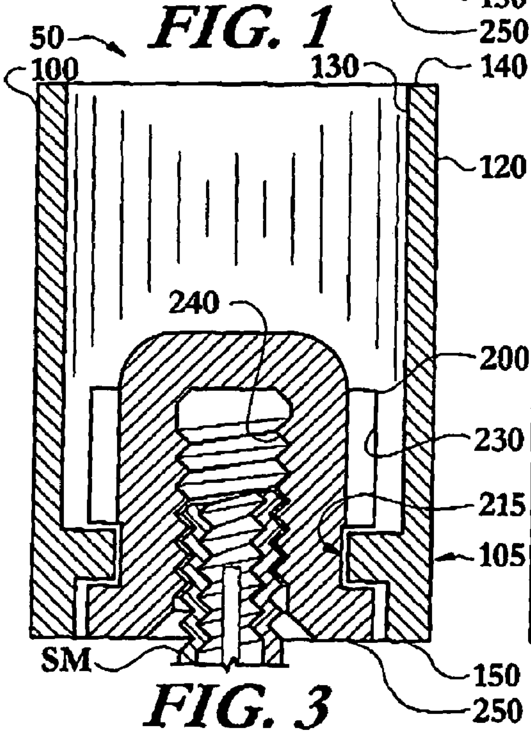
FIG. 3 shows the security cap of FIG. 1 in cross-sectional view taken along section line 3—3 in FIG. 2, not to scale.
Figure 12:
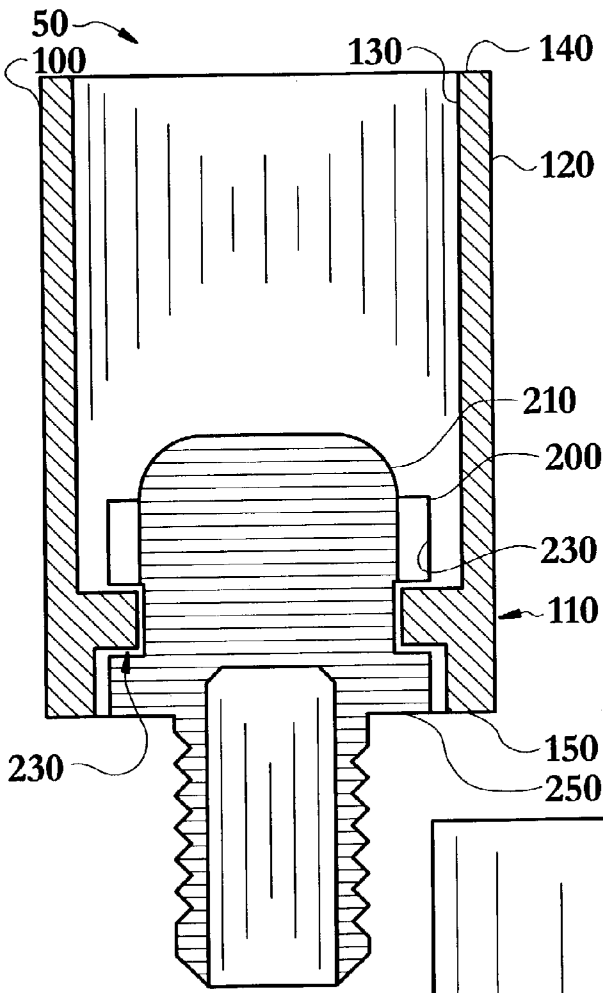
FIG. 12 shows a variation of the security cap of FIG. 1 in cross-sectional view, not to scale.

The security cap 200 may include numerous embodiments directed toward specific applications and include features relevant to such applications. For instance, the security cap 200 may be formed having an inner surface 240 that is threaded to cooperate with the male threads of an external device, thereby acting truly as a cap, as shown in FIG. 3. Alternatively, the security cap 200 may be formed with a male engagement projection that is externally threaded, as shown in FIG. 12, to act as a plug. Such threads may incorporate any international standards on threads, including, but not limited to, Unified Inch Screw Threads, Metric Screw Threads, American National Standard Taper Pipe Thread, American National Standard Straight Pipe Thread, and American National Standard Dryseal Pipe Threads, or may be custom (non-standard) threads for additional security. Further, the shroud and security cap may be formed to surround a valve stem. One particular embodiment, that shown in FIG. 3, is directed to a tamper resistant rotably shrouded security cap 50 for use in residential and commercial refrigeration systems to secure ¼" flare fittings and prevent unauthorized access to the refrigerant. As one with skill in the art can appreciate, this tamper resistant rotably shrouded security cap 50 can be applied to fluid handling systems of any size and configuration.

The security socket 300 may be formed in numerous variations to cooperate with any of the tamper resistant rotably shrouded security cap 50 embodiments described herein. One such embodiment is shown in FIG. 9, and illustrates a female socket configuration wherein the security socket 300 is designed to fit inside the shroud 100 and receive the security cap 200. The security socket 300 of the present embodiment includes a socket inner surface 330 having at least one keyway engager 332 adapted to cooperate with the at least one keyway in the security cap 200. The security socket 300 may be formed as a distinct tool that must be attached to an external tool, such as a socket wrench, for application of the rotary force, as shown in FIG. 9, or the security socket 300 may be formed as a unitary tool such as that shown in FIG. 21. In any event, the security socket 300 may be formed with a gripping recess 312 and surface texture 314 to assist the user in gripping the security socket 300, as shown in FIG. 9. The security socket 300 may be formed to include means for being engaged by virtually any external rotary force producing tool. For example, the security socket 300 may include a tool engager 316 that works with conventional socket wrenches. Alternatively, the tool engager 316 may be sized to cooperate with the 5⁄16" square opening of a refrigeration valve wrench. Yet another option, not shown, for the tool engager 316 is simply a hole that passes through the security socket 300 and receives a small bar that may be used to provide torque on the security socket 300.

When the security socket 300 is formed as a unitary tool, such as that shown in FIG. 21, it may include a gripping device 320, such as a screwdriver handle, a shaft 318, and a tool engagement region 322, in addition to the security socket 300. The embodiment shown in FIG. 21 illustrates a male socket configuration wherein the security socket 300 is designed to fit inside the recess 280 and engage the at least one keyway 230.

Access to the fluid system is thereby controlled by controlling access to the security socket 300. By way of example and not limitation, manufacturers or designers of systems could restrict access to the security socket 300 to those authorized to repair such systems. Alternatively, if a certain level of authority were required to make adjustments in a system, the security socket 300 could be provided only to those having such authority.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

The corresponding structures, materials, acts, and equivalents of all means or step plus function elements in the claims below are intended to include any structure, material, or acts for performing the functions in combination with other claimed elements as specifically claimed.

I claim:

1. A tamper resistant rotably shrouded security cap and tool for preventing unauthorized access to a fluid handling system, comprising:

a grip resistant rotating shroud having a shroud outer surface, a shroud inner surface, a shroud top edge, and a shroud lower edge, formed to have a cap engagement means;

a security cap, formed with at least one security keyway, having a grip resistant cap outer surface, a cap inner surface, and a cap lower edge located internally to the grip resistant rotating shroud, formed to have a single shroud engagement means to rotably cooperate with the cap engagement means and to ensure that the grip resistant rotating shroud cannot be separated from the security cap without damage to the cap or shroud, wherein the security cap blocks access to the fluid handling system when installed;

wherein the shroud lower edge extends at least to the cap lower edge;

a security socket having a socket outer surface, a socket inner surface, and at least one keyway engager adapted to cooperate with the at least one security keyway of the security cap; and wherein, the cap engagement means is formed to include an integral cap retaining ledge extending from the shroud inner surface and the shroud engagement means is formed to include a shroud receiver shelf recessed in the cap outer surface to rotably receive the cooperating cap retaining ledge.

2. The tamper resistant rotably shrouded security cap and tool of claim 1, wherein at least a portion of the cap inner surface is threaded to cooperate with a threaded male pardon of an external device.

3. The tamper resistant rotably shrouded security cap and tool of claim 1, wherein the security socket outer surface is formed to have a tool engager that releasably engages an external rotary force.

4. The tamper resistant rotably shrouded security cap and tool of claim 1, wherein the security socket outer surface is formed to include a shaft having a gripping device and a tool engagement region.

5. The tamper resistant rotably shrouded security cap and tool of claim 1, further including an auxiliary rotation mechanism adapted to rotably join the cap engagement means and the shroud engagement means.

6. The tamper resistant rotably shrouded security cap and tool of claim 1, further including an external engagement surface on the security cap wherein at least a portion of the external engagement surface is threaded to cooperate with a threaded female portion of an external device.

7. The tamper resistant rotably shrouded security cap and tool of claim 1, wherein the at least one security keyway is formed in a recess in the security cap.

8. A tamper resistant rotably shrouded security cap and tool for preventing unauthorized access to a fluid handling system, comprising:

a grip resistant rotating shroud having a shroud outer surface, a shroud inner surface, a shroud top edge, and a shroud lower edge, formed to have a cap engagement means;

a security cap, formed with at least one security keyway, having a grip resistant cap outer surface, a cap inner surface, and a cap lower edge located internally to the grip resistant rotating shroud, formed to have a single shroud engagement means to rotably cooperate with the cap engagement means and to ensure that the grip resistant rotating shroud cannot be separated from the security cap without damage to the cap or shroud, wherein the security cap blocks access to the fluid handling system when installed;

wherein the shroud lower edge extends at least to the cap lower edge;

a security socket having a socket outer surface, a socket inner surface, and at least one keyway engager adapted to cooperate with the at least one security keyway of the security cap; and wherein the cap engagement means is formed to include an integral cap receiver shelf formed in the shroud and the shroud engagement means is formed to include a shroud retaining ledge extending from the cap outer surface to rotably receive the cooperating cap receiver shelf.

9. The tamper resistant rotably shrouded security cap and tool of claim 8, wherein at least a portion of the cap inner surface is threaded to cooperate with a threaded male portion of an external device.

10. The tamper resistant rotably shrouded security cap and tool of claim 8, wherein the security socket outer surface is formed to have a tool engager that releasably engages an external rotary force.

11. The tamper resistant rotably shrouded security cap and tool of claim 8, wherein the security socket outer surface is formed to include a shaft having a gripping device and a tool engagement region.

12. The tamper resistant rotably shrouded security cap and tool of claim 8, further including an auxiliary rotation mechanism adapted to rotably join the cap engagement means and the shroud engagement means.

13. The tamper resistant rotably shrouded security cap and tool of claim 8, further including an external engagement surface on the security cap wherein at least a portion of the external engagement surface is threaded to cooperate with a threaded female portion of an external device.

14. The tamper resistant rotably shrouded security cap and tool of claim 8, wherein the at least one security keyway is formed in a recess in the security cap.

* * * * *